Oct. 3, 1944.   W. STELZER   2,359,687
HYDRAULIC BRAKE BOOSTER
Filed Aug. 29, 1942   4 Sheets-Sheet 1

INVENTOR.
William Stelzer

Oct. 3, 1944.    W. STELZER    2,359,687
HYDRAULIC BRAKE BOOSTER
Filed Aug. 29, 1942    4 Sheets-Sheet 2
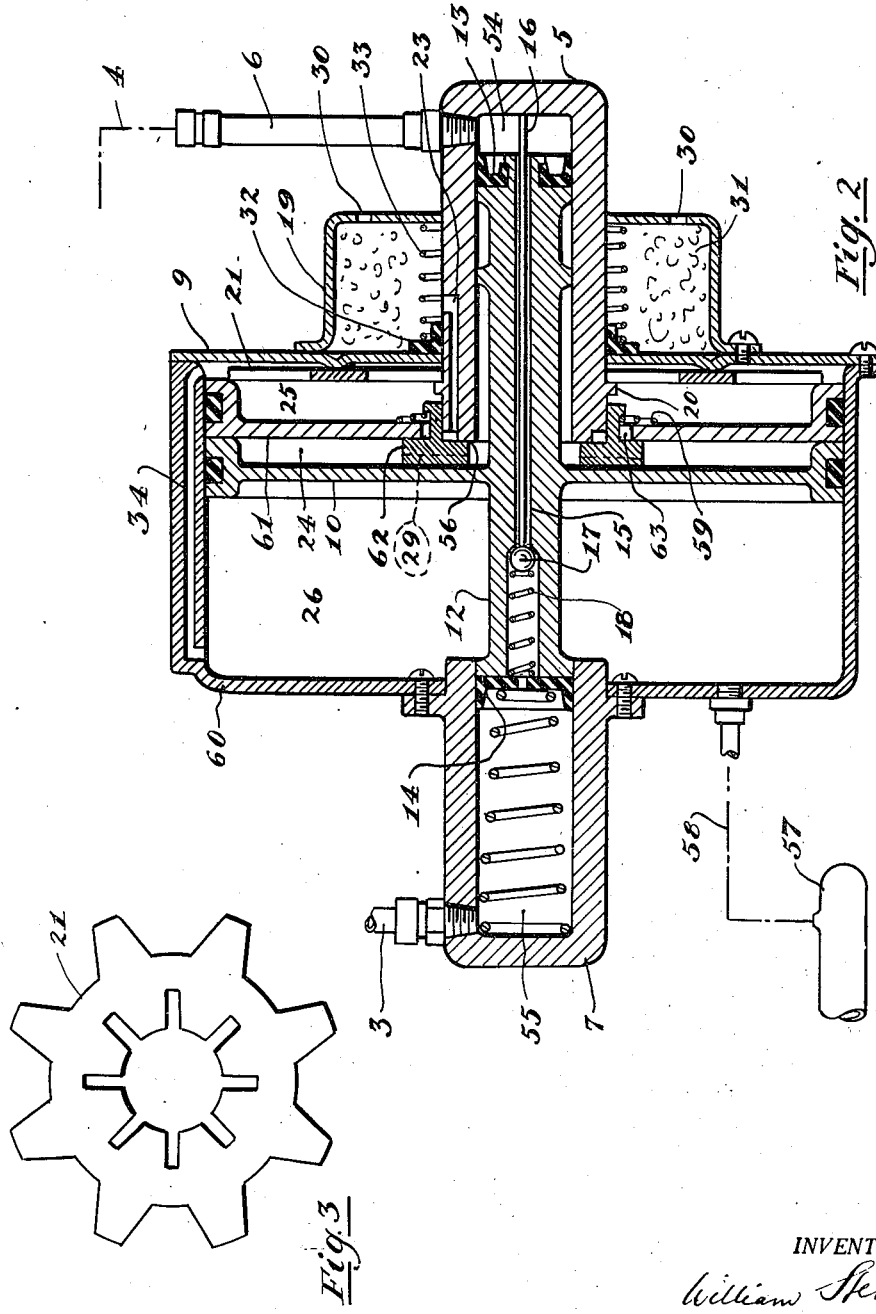
INVENTOR.
William Stelzer

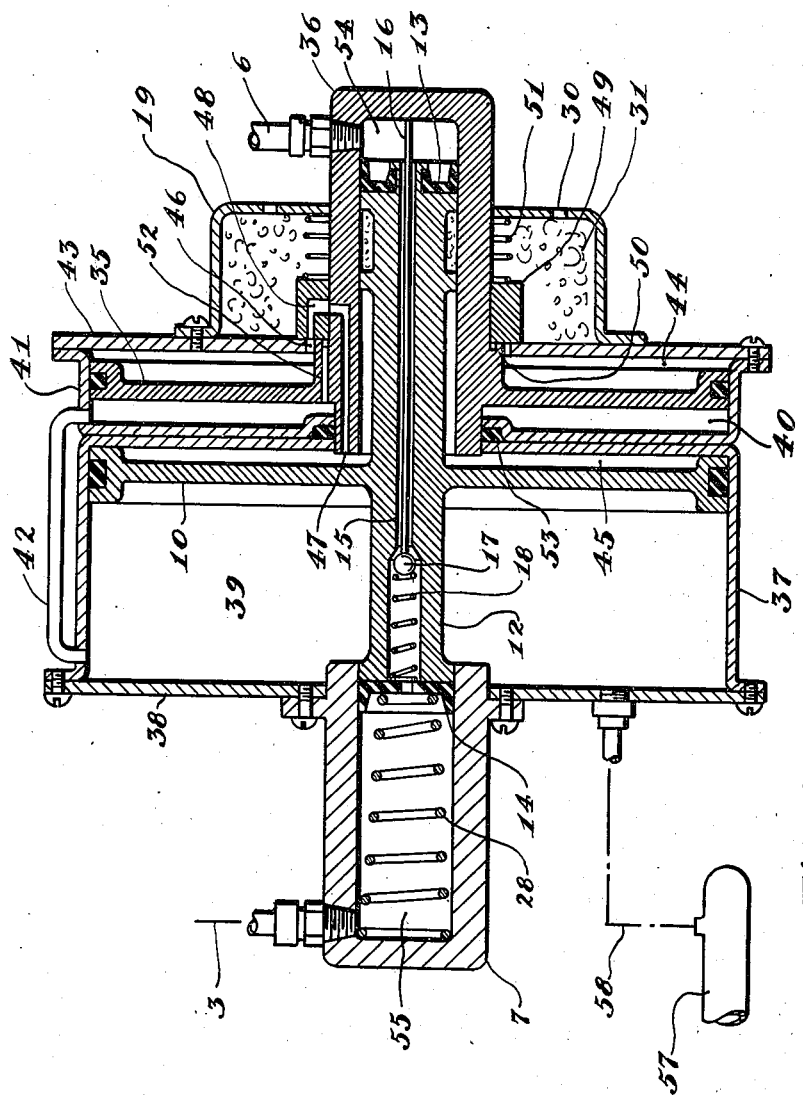

Oct. 3, 1944.                W. STELZER                 2,359,687
                        HYDRAULIC BRAKE BOOSTER
                        Filed Aug. 29, 1942          4 Sheets-Sheet 4

INVENTOR.
William Stelzer.

Patented Oct. 3, 1944

2,359,687

UNITED STATES PATENT OFFICE 2,359,687

HYDRAULIC BRAKE BOOSTER

William Stelzer, Detroit, Mich.

Application August 29, 1942, Serial No. 456,652

15 Claims. (Cl. 60—54.5)

The invention relates to hydraulic brake boosters and more particularly to a hydraulic brake booster for increasing the hydraulic pressure in a braking system, using a power operated expansible chamber motor mechanism controlled by the reaction of the manually produced fluid pressure and the reaction of the boosting force.

The object of the invention is to provide a novel construction to utilize the reaction of the primary or low pressure cylinder to regulate the flow of power to and from the booster in order to maintain a pre-determined booster ratio.

Another object is to balance the reaction of the primary cylinder against the reaction of the power operated expansible chamber motor mechanism, to utilize the elements required for boosting the fluid pressure also for the purpose of control whereby the usual fluid pressure sensitive elements used to govern the valve may be dispensed with and the construction greatly simplified.

The invention also aims to provide a novel construction that lends itself ideally for mass production, by the obviation of complicated and numerous parts.

Figure 1:
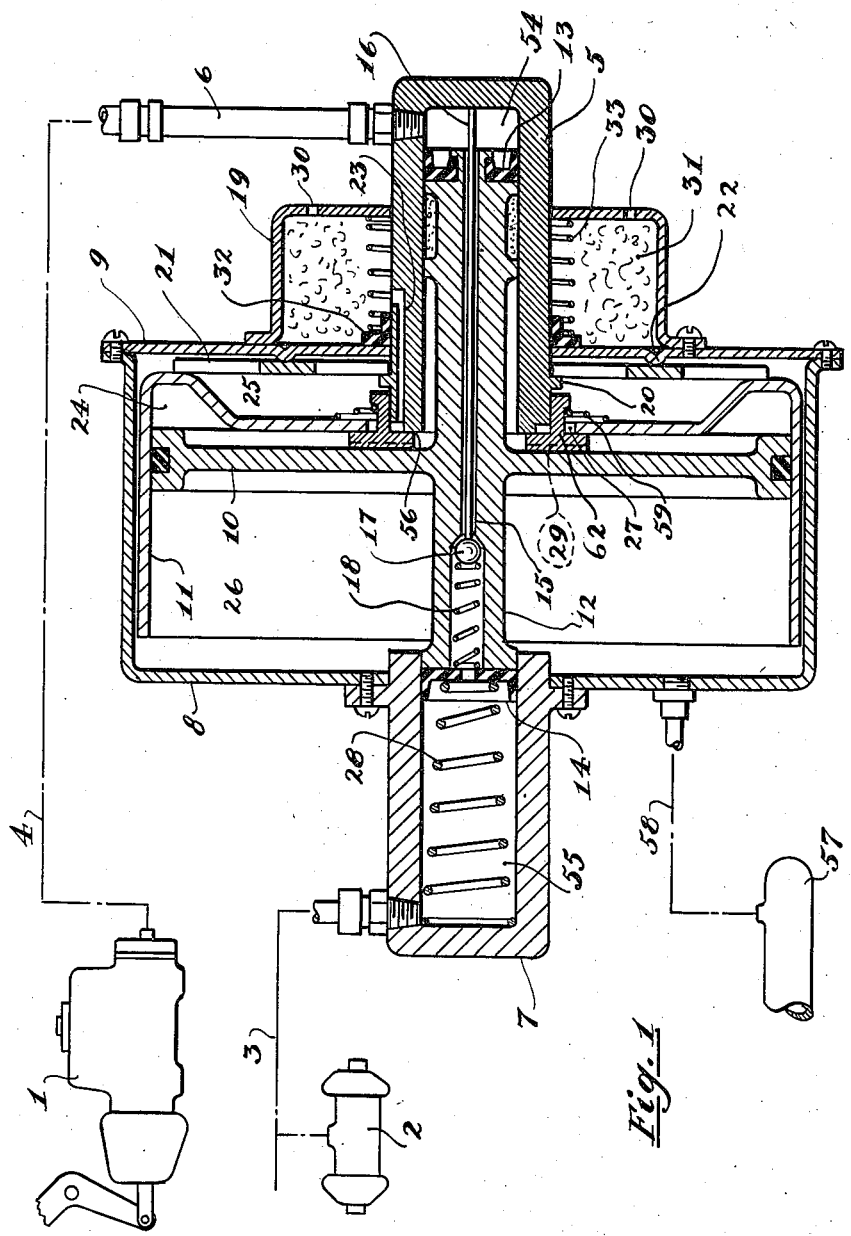
Figure 5:
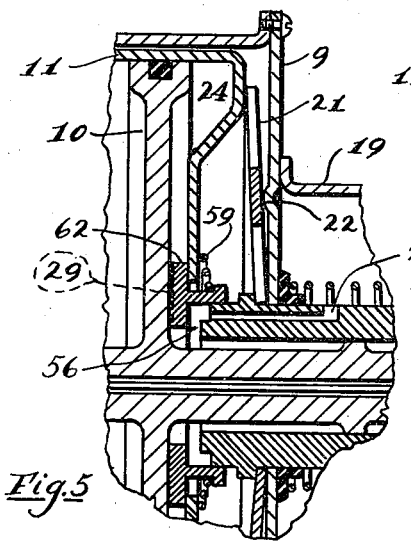
Figure 6:
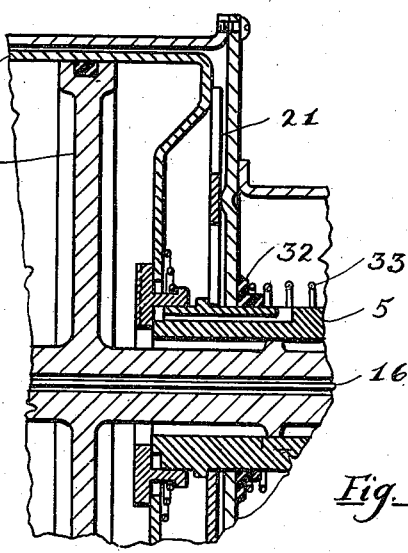
Figure 7:
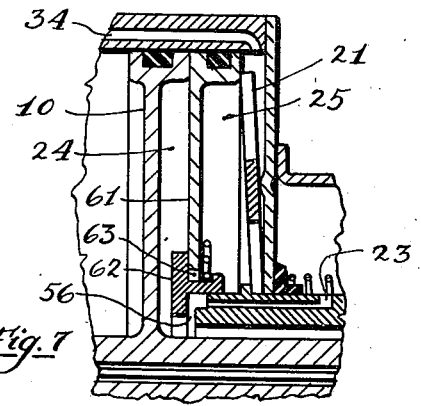
Figure 8:
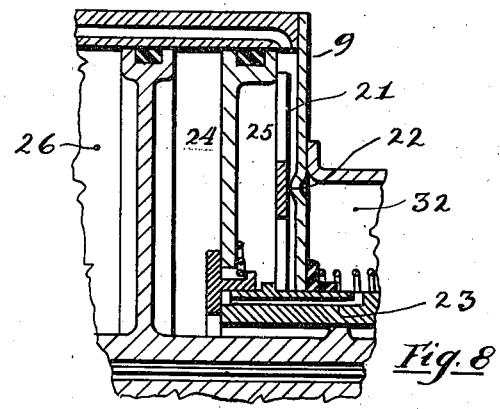
Figure 9:
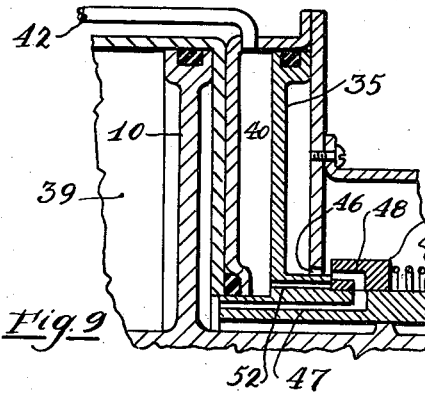
Figure 10:
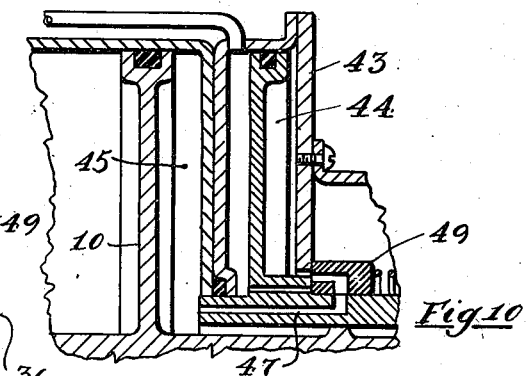

Other advantages and features will become apparent by inspection of the drawings, wherein:

Fig. 1 is a cross sectional side elevation of the improved hydraulic booster, connected to a conventional hydraulic braking system shown diagrammatically;

Fig. 2, a cross sectional side elevation showing the booster in a modified construction;

Fig. 3, a front elevation of the balancing plate used in the construction shown in Fig. 2;

Fig. 4, a cross sectional side elevation of the booster showing a further modification;

Fig. 5, a fragmentary cross sectional side elevation of the booster shown in Fig. 1, illustrating the operating position of the valve elements when the pedal is depressed and the booster becomes energized;

Fig. 6, a similar view of the construction shown in Fig. 1, illustrating the "holding position" of the booster where the pistons have advanced to apply the brakes and the power or force of application is held, but not increased;

Fig. 7, a fragmentary cross sectional side elevation of the construction shown in Fig. 2, illustrating the operating position where the booster becomes energized;

Fig. 8, a similar view of the construction shown in Fig. 2, illustrating the holding position;

Fig. 9, a fragmentary cross sectional side elevation of the construction shown in Fig. 4, illustrating the operating position where the booster becomes energized; and Fig. 10, a similar view of the construction shown in Fig. 4, illustrating the holding position.

Describing the invention now more in detail, and referring in particular to Fig. 1, there is shown a conventional hydraulic braking system consisting of a master cylinder 1 operated by the operator and a plurality of wheel cylinders 2, of which only one is shown in order not to encumber the drawings. Fluid pressure line 3 is shown branching off to lead to other wheel cylinders or fluid pressure receiving means in which a boosted pressure is required. Interposed between the master cylinder and the wheel cylinders of this conventional braking system is the novel brake booster, whereby the fluid pressure line leading from the booster to the master cylinder is designated by 4.

The novel hydraulic brake booster has two hydraulic cylinders of which the primary or low pressure cylinder 5 is connected to the master cylinder through a flexible hose 6 and line 4, constituting the primary or low pressure circuit, and the secondary cylinder 7 is connected to line 3 leading to the wheel cylinders, which I shall refer to as the secondary or high pressure circuit. The secondary cylinder 7 is secured to a shell 8 closed by a plate 9 to serve as a power reservoir and to house the expansible chamber motor mechanism consisting of piston 10 and power cylinder 11 adapted to slide endwise a short distance. The central portion of power piston 10 forms a part of the hydraulic piston 12 whose ends are sliding in the hydraulic cylinders 5 and 7 and are provided with seals 13 and 14 respectively. A fluid passage 15 accommodating a rod 16 to hold a check valve consisting of a ball 17 and spring 18 open when the booster is in the "off" position, serves to provide communication between the primary circuit and the secondary circuit when the booster is not in operation.

While the secondary cylinder is rigidly connected to the housing of the booster, which may be securely mounted to a structural member of the vehicle in which this braking system is used, the primary cylinder 5 is adapted to slide relative to shell 8 and for this purpose is slidably held by cover 9 and air cleaner cover 19 to move in axial alignment with piston 12 as well as cylinders 7 and 11.

The primary cylinder 5 has a collar or shoulder 20 acting against a balancing plate 21 which is shown in detail in Fig. 3 and which may be considered as a plurality of balancing levers whose fulcrum is at 22 where an annular rib is provided in cover 9. Thus plate 21 as illustrated in Fig. 3, is equivalent to eight separate levers arranged radially. Their central portions are joined together merely to hold the lever in the proper position. Since the joining strips of metal near the circular line in contact with fulcrum 22 are relatively narrow, the resistance offered by them against flexion is small. The outer extremity of balancing plate 21 is in contact with power cylinder 11 so that the reactions of the latter and cylinder 5 oppose each other and operate valve 62 which is slidably fitted on cylinder 5 and controls the passage of air through hole 23 into chamber 24, as well as the evacuation of air from chamber 24 through passage 27 into vacuum chambers 25 and 26 communicating through the clearance space between shell 8 and cylinder 11. 57 indicates a source of vacuum or low pressure such as the intake manifold of an internal combustion engine, connected to vacuum reservoir or housing 8 through a line 58. As a source of pressure to operate piston 10 I utilize the atmosphere in this preferred embodiment, whereby the air is permitted to enter through holes 30 into chamber 31 containing a filtering material. A slidable seal 32 pressed against cover 9 by a spring 33 prevents air from passing directly into chamber 25. It is apparent that instead of atmospheric pressure any other source of pressure may be used without changing the principle of the invention.

Pistons 10 and 12 are urged into the "off" position as shown by a return spring 28, whereby power piston 10 comes to rest against valve 62. In order to permit free passage of air between the two parts one or a plurality of radial grooves 29 is provided. Spring 59 serves to urge said valve into a closed position as well as to prevent the use of power when the brake effort is very small.

In the embodiment shown in Fig. 2 chamber 26 is formed by a fixed power cylinder 60 in which pistons 10 and 61 slide. The latter engages valve 62 and has a central opening which provides an air passage 63. The outer portion of the control piston 61 engages balance plate 21 whereby the function of piston 61 is similar to that of cylinder 11 in Fig. 1. A passage 34 provides communication between vacuum chambers 25 and 26. While the construction illustrated in Fig. 1 is particularly suited for use in vehicles where the booster is exposed to the impact of stones or other objects, because the outer casing 8 serves as a protective armor where dents or blows do not affect the operation of the booster, the modification shown in Fig. 2 may be suited where the booster is mounted in a protected position or where cylinder 60 is of sufficient rigidity to withstand abuse.

Fig. 4 shows a further modification where the balancing plate is eliminated and control piston 35 and primary cylinder 36 are of one piece to move in unison. Power piston 10 moves in cylinder 37 closed by a cover 38 secured to secondary cylinder 7 to form a vacuum chamber 39. The latter is in communication with chamber 40 of control cylinder 41 by means of passage 42. 43 denotes an end plate secured to cylinder 41 to form a chamber 44 communicating permanently with chamber 45 of the power cylinder through opening 46 in end plate 43, passage 47 in primary cylinder 36, and hole 48 in valve 49 which is held against plate 43 and shoulder 50 of primary cylinder 36 by means of a spring 51. One or preferably a plurality of holes 52 leads to vacuum chamber 40 but is closed when valve 49 is in the closed position as shown. As the primary cylinder is slidable relative to power cylinder 37 and control cylinder 41, it is guided by and adapted to move endwise in air cleaner housing 19 and the central portion of the cylinder sides of power cylinder 37 and control cylinder 41 secured together where a seal 53 is provided to prevent flow of air from pressure chamber 45 into vacuum chamber 40.

Having thus described the details of the novel construction, I shall now illustrate the operation of the same, referring in particular to Fig. 1, which shows the booster in the "off" position where the moving members are retracted, the pressure in the master cylinder relieved, and the supply of power is cut off from the expansible chamber motor mechanism. Due to the source of vacuum 57 a low pressure exists in chambers 24, 25, and 26. The vacuum pressure from chamber 26 is communicated to chamber 25 through the clearance space between cylinder 11 and housing 8. The evacuation of chamber 24 results from the action of valve 62 which is unseated from cylinder 11 when the pressure in chamber 24 is greater than in chambers 25 and 26, the pressure in chamber 24 urging cylinder 11 towards the right, which movement is transmitted through plate 21 to cylinder 5 to force the latter towards the left, whereby communication is established between chamber 25 and chamber 24 via passage 27. While the pressure in chamber 24 also reacts on piston plate 10 to urge it towards the left, spring 28 is of sufficient strength to resist the movement of piston 10 and to cause spring 59 to yield first, i. e., the air pressure in chamber 24 acting on cylinder 11 urges the latter towards the right against lever member 21 which transmits the movement to cylinder 5 to force it to the left, together with valve 62 and piston 10, so that the valve becomes unseated and the air can escape from chamber 24 into 25 and 26 until the pressures are equalized.

Assuming now that the operator depresses the brake pedal to apply the brakes, hydraulic fluid is transmitted from the master cylinder 1 through line 4 into chamber 54, passage 15, chamber 55, and line 3 to the wheel cylinders 2 whose pistons expand to apply the brake shoes. As soon as the brake shoes come into contact with the brake drum the resistance to further expansion increases and consequently the operator has to exert a greater manual effort resulting in an increased hydraulic pressure in the entire system, with an accompanying increase in reaction acting on primary cylinder 5. This reaction is transmitted by shoulder 20 to plate 21 which reverses the force to act in the opposite direction against cylinder 11 which again transmits the force to piston 10 through the intermediary of valve 62, tending to overcome spring 28. The stiffness of spring 28 determines the point where the booster becomes operative. To conserve the supply of power it is desirable that the booster does not go into action until the force exerted by the operator becomes noticeable. As the reaction of cylinder 5 overpowers spring 28 piston 12 as well as valve 62 and cylinder 11 move away from cylinder 5 so that a passage is opened at 56 to admit air from the atmosphere through air cleaner 19 and port 23 into chamber 24, passing through grooves 29. The position of the elements at this stage of the operation is illustrated in Fig. 5. The increased pressure in chamber 24 acting on piston 10 urges the movement of piston 12 into secondary cylinder 7, causing piston 10 to separate from valve 62 and ball 17 to become seated, thereby the primary circuit and the secondary circuit become separated and the latter is under higher pressure due to the boosting action of piston 10. The resultant pressure in the secondary circuit is the sum of the primary pressure acting on piston 12 and the air pressure acting on power piston 10. Consequently, the proportion between the power cylinder 11 and primary cylinder 5 determines the booster ratio. However, the latter also depends on the leverage of balancing plate 21. Thus, if fulcrum point 22 is moved farther out, the predetermined booster ratio is greater. The boosting force is constantly in a pre-determined proportion to the primary pressure which is the result of the pedal pressure exerted by the operator. Assuming that too much air pressure exists in chamber 24, which may occur when the operator reduces the manual pressure on the brake pedal, cylinder 11, immediately overpowers cylinder 5 whereby cylinder 11 advances towards plate 9 and the primary cylinder retracts in the opposite direction, carrying valve 22 with it to close passage 56 and opening a passage from chamber 24 through 27 into chamber 25 against the pressure of spring 59, allowing chamber 24 to relieve its pressure until the power booster and the primary pressure are balanced again when valve 62 assumes a holding position where passages 27 and 56 are closed off, as shown in Fig. 6. To prevent valve 62 to open or close due to the slightest pressure differences, it is desirable that spring 59 urges valve 62 into a closed position with a sufficient force. Assuming now that the operator releases his pressure on the brake pedal and consequently relieves the pressure in the primary circuit, cylinder 11 immediately moves towards plate 9 until it comes to rest against it with the outer extremity of balancing plate 21 interposed, forcing cylinder 5 in the opposite direction and opening valve 62 to relieve the pressure from chamber 24 into chamber 25 and 26. The remaining pressure in cylinder 7 combined with spring 28 urges piston 12 into the "off" position as shown in Fig. 1, causing ball 17 to unseat to establish communication between the primary and secondary circuits.

The operation of the modified booster shown in Fig. 2 is very similar to that described for Fig. 1. The function of piston 61 as far as the operation of the valve 62 is concerned, is identical with the function of cylinder 11 described hereinbefore.

The operation of the modified booster shown in Fig. 4 will now be briefly described. The connection of the circuits of the braking system is the same as shown in Fig. 1. When the operator steps on the brake pedal and the primary pressure in cylinder 36 is sufficient to overcome spring 51, cylinder 36 and with it piston 35 move out in a direction to increase the volume of chamber 54 whereby valve 49 is picked up and unseated from plate 43 to allow air to pass through passage 46 into chamber 44 as well as into chamber 45 through passage 47, urging piston 10 to advance to force piston 12 to enter secondary cylinder 7 to boost the secondary pressure as soon as valve 17 is closed. The position of the elements when air is admitted to chamber 44 is illustrated in Fig. 9. The reaction of the primary pressure on cylinder 36 is counteracted and balanced by the fluid pressure of the power fluid admitted to the booster by acting on the control piston 35, the size of which determines the booster ratio. When too much power fluid is admitted to the booster, piston 35 overpowers cylinders 36, allows valve 48 to seat on plate 43 and then unseats shoulder 50 from valve 49 to allow relief of air pressure from chamber 45 through passages 47, 48, and 52 into low pressure chamber 40 and 39. The holding position, where the brakes are held applied and the pressure in chamber 45 is in the proper proportion to the manually produced pressure in chamber 54, is illustrated in Fig. 10. When the operator releases the brake pedal entirely with a consequent reduction of the force of reaction of cylinder 36, the existing air pressure in chamber 44 immediately actuates piston 35 to unseat shoulder 50 to allow the air in chambers 44 and 45 to evacuate through passage 52 and 42 until a vacuum exists in chambers 44 and 45. At the same time spring 28 returns piston 12 to the "off" position as shown, unseating ball 17 to allow fluid to flow from the wheel cylinders to the master cylinder. It will be noted that in the "off" position of the booster chamber 45 is in communication with the low pressure through passages 47, 48, and 52. The communication is established due to the existing pressure in chamber 44 which urges piston 35 to the left sufficiently to unseat shoulder 50. After the pressure in chambers 44 and 45 is relieved piston 35 may move to the right again due to the residual hydraulic pressure in the brake line, acting in chamber 54, which, however, is not sufficient to compress spring 51 after shoulder 50 has come in contact with valve 49.

In order to operate the control valve only a very small movement of the primary cylinder is required. This is particularly true of the embodiment shown in Fig. 1 where the valve travel is augmented due to the relative movement of cylinder 5 and power cylinder 11. Thus the height of the welt or annular rib 22 may be much smaller than shown, having been exaggerated in the drawings in order to make a clear illustration.

While I have shown sliding type pistons in a diagrammatic manner, it is apparent that any other type of piston may be used, particularly the diaphragm type, without departing from the principle of the invention.

Having shown three different embodiments by way of example, I do not wish to be limited to these particular embodiments except by the terms of the appended claims.

I claim:

1. In a hydraulic system having hydraulic pressure producing means and hydraulic pressure receiving means, in combination, a booster unit comprising a primary cylinder in communication with said hydraulic pressure producing means a secondary cylinder in communication with said hydraulic pressure receiving means, a piston in said secondary cylinder to force hydraulic fluid to said hydraulic pressure receiving means, a piston in said primary cylinder to transmit the force of the liquid in said primary cylinder to act on said piston in said secondary cylinder, an expansible chamber motor mechanism to act on said piston in said secondary cylinder to boost the hydraulic pressure in the latter, said primary cylinder being arranged to slide endwise a short distance, power fluid to operate said expansible chamber motor mechanism, valve means to direct power fluid to and from said expansible chamber motor mechanism, means to transmit the reaction of the pressure of the power fluid directed to said expansible chamber motor mechanism to act on said primary cylinder to oppose the hydraulic reaction of said primary cylinder, and means responsive to the movement of said primary cylinder to operate said valve means.

2. In a hydraulic braking system having a master cylinder and wheel cylinders to apply the brakes, a hydraulic booster comprising a primary cylinder in communication with the said master cylinder, a secondary cylinder in communication with said wheel cylinders, a piston in said secondary cylinder to force hydraulic fluid to said wheel cylinders, a piston in said primary cylinder to transmit the force of the hydraulic fluid in the latter to said piston in said secondary cylinder to increase the hydraulic pressure in said secondary cylinder, an expansible chamber motor mechanism to exert a force on the piston in said secondary cylinder to boost the pressure therein, said primary cylinder being mounted to yield a short distance to the pressure therein, power fluid to operate said expansible chamber motor mechanism, and valve means responsive to the yield of said primary cylinder to direct power fluid to and from said expansible chamber motor mechanism.

3. The construction as claimed in claim 2, and means where the yield of said primary cylinder is opposed by the reaction of said expansible chamber motor mechanism.

4. The construction as claimed in claim 2, and means responsive to the pressure of the power fluid directed to said expansible chamber motor mechanism to oppose the yield of said primary cylinder.

5. The construction as claimed in claim 2 where said expansible chamber motor mechanism is mounted yieldingly, means to transmit the reaction of said expansible chamber motor mechanism to oppose the yield of said primary cylinder.

6. In a hydraulic braking system having a master cylinder operated by the operator and wheel cylinders to operate the brake shoes, in combination, a primary cylinder, fluid pressure transmitting means from said primary cylinder to said master cylinder, a secondary cylinder, fluid pressure transmitting means from said secondary cylinder to said wheel cylinders, an expansible chamber motor mechanism to boost the pressure in said secondary cylinder, a supply of power fluid to operate said expansible chamber motor mechanism, a piston in said primary cylinder to actuate a piston in said secondary cylinder to transmit the hydraulic pressure from said primary cylinder to said secondary cylinder, said primary cylinder being mounted to be able to move endwise, means to transmit the force of reaction acting on said primary cylinder to oppose the reaction of said supply of power fluid acting on said expansible chamber motor mechanism, and valve means responsive to the excursions of said primary cylinder to direct power fluid to and from said expansible chamber motor mechanism.

7. A hydraulic pressure booster having a primary cylinder connected to a primary circuit, a secondary cylinder connected to a secondary circuit, a piston in said secondary cylinder, a piston in said primary cylinder to superimpose the pressure of said primary circuit on the pressure of said secondary circuit, an expansible chamber motor mechanism to act on said piston in said secondary cylinder to increase the hydraulic pressure therein, a supply of power to operate said expansible chamber motor mechanism, said primary cylinder being able to move endwise a short distance in order to be responsive to the reaction due to the internal pressure in said primary cylinder, means responsive to the power exerted by said expansible chamber motor mechanism to oppose the movement of said primary cylinder, and valve means cooperating with said primary cylinder to maintain the power exerted by said expansible chamber motor mechanism in proportion with the hydraulic pressure in said primary cylinder.

8. In a hydraulic braking system having a master cylinder operated by the operator and wheel cylinders to apply the brakes, a hydraulic booster comprising a primary cylinder in communication with said master cylinder, a secondary cylinder in communication with said wheel cylinders, a piston in said secondary cylinder to force hydraulic fluid to said wheel cylinders, a piston in said primary cylinder to transmit the force of hydraulic fluid in the latter to said piston in said secondary cylinder to increase the hydraulic pressure in said secondary cylinder, an expansible chamber motor mechanism to exert a force on the piston in said secondary cylinder to boost the pressure therein, said primary cylinder and said expansible chamber motor mechanism being mounted to be able to yield a short distance due to their reactions, power fluid to operate said expansible chamber motor mechanism, valve means to direct power fluid to and from said expansible chamber motor mechanism, said valve means being responsive to the movements of said primary cylinder and said expansible chamber motor mechanism whereby the yield of said primary cylinder urges said valve means to direct power fluid to said expansible chamber motor mechanism and the yield of the latter urges said valve means to direct power fluid from said expansible chamber motor mechanism.

9. A hydraulic pressure booster having a primary cylinder connected to a primary circuit, a secondary cylinder connected to a secondary circuit, a piston in said secondary cylinder, a piston in said primary cylinder, said pistons being mechanically connected to transmit the hydraulic pressure in said primary cylinder to the fluid in said secondary cylinder, an expansible chamber motor mechanism consisting of a power cylinder having a power piston, said power piston being arranged to assist said piston in said secondary cylinder to boost the hydraulic pressure therein, said power cylinder being arranged to allow a limited motion endwise, said primary cylinder being also arranged to permit a limited motion endwise, means to counterbalance said power cylinder against said primary cylinder so that the reaction of said power cylinder opposes the reaction of said primary cylinder, valve means responsive to the excursions of said primary cylinder and said power cylinder due to their unbalancement to direct power fluid to and from said expansible chamber motor mechanism whereby the reaction of said primary cylinder urges said valve to increase the power of said expansible chamber motor mechanism and the reaction of said power cylinder urges said valve to decrease the power of said expansible chamber motor mechanism.

10. The construction as claimed in claim 9 where said expansible chamber motor mechanism is enclosed in a housing which serves as a vacuum reservoir and as a protective enclosure for said expansible motor mechanism.

11. The construction as claimed in claim 9, and means to provide a fluid passage between said primary cylinder and said secondary cylinder when said hydraulic pressure booster is in the "off" position.

12. The construction as claimed in claim 9, and means to return said pistons to the "off" position.

13. The construction as claimed in claim 9, where said primary cylinder, said secondary cylinder, said expansible chamber motor mechanism, said pistons, said means for counter-balancing, and said valve means form a single, self-contained unit.

14. A hydraulic pressure booster having a primary cylinder connected to a primary circuit, a secondary cylinder connected to a secondary circuit, a piston in said secondary cylinder, a piston in said primary cylinder connected mechanically to said piston in said secondary cylinder to transmit the hydraulic pressure in said primary cylinder to said secondary cylinder, an expansible chamber motor mechanism having a power cylinder and a power piston slidable therein, the latter being connected to assist said piston in said secondary cylinder to boost the hydraulic pressure in said secondary circuit, a supply of power fluid, a control piston slidable a short distance in said power cylinder and responsive to the power acting on said power piston, said primary cylinder being arranged to be able to move endwise a short distance in order to be responsive to the reaction due to the hydraulic pressure in said primary cylinder, means to transmit the pressure acting on said control piston to oppose the reaction of said primary cylinder, valve means operated by the excursions of said primary cylinder to direct power fluid to and from said expansible chamber motor mechanism, whereby the reaction of said primary cylinder urges said valve to increase the power of said expansible chamber motor mechanism, and said control piston urges said valve to decrease the power of said expansible chamber motor mechanism.

15. The construction as claimed in claim 14, where said hydraulic pressure booster forms a single, self-contained unit, means to establish communication between said primary circuit and said secondary circuit when said booster is in the "off" position, and means to return said pistons to the "off" position when the pressure in said primary cylinder is relieved.

WILLIAM STELZER.